May 22, 1962 N. G. KAMEN 3,036,146
EXTENSIBLE CABLE
Filed Dec. 30, 1959 2 Sheets-Sheet 1

INVENTOR
NATHANIEL G. KAMEN
BY R. C. Terry
ATTORNEY

United States Patent Office 3,036,146
Patented May 22, 1962

3,036,146
EXTENSIBLE CABLE
Nathaniel G. Kamen, Chicago, Ill., assignor to Teletype Corporation, Chicago, Ill., a corporation of Delaware
Filed Dec. 30, 1959, Ser. No. 863,024
3 Claims. (Cl. 174—69)

This invention relates to an extensible cable and to a method for making an extensible cable.

The majority of present day electrical apparatus is housed in cabinets and the electrical components which make up the electrical apparatus and circuits are mounted in pull-out type drawers which may be pulled out of the cabinet to make the electrical components readily accessible for maintenance and repair. The electrical components in the drawer are connected to other components in other parts of the cabinet by cables which extend from the backs of the drawers to the points of connection with other components. Since space is usually at a premium in the cabinets, such an arrangement presents the need for a cable which occupies a small amount of space and yet which will be long enough to permit the cabinet drawer to be pulled out of the cabinet. However, the use of the cable to perform the interconnections between the components contained in the pull-out type drawers presents a problem in itself, namely, the cable must be of such design and configuration that it will permit ready withdrawal of the drawer from the cabinet and also be self-restoring in an orderly, non-entangling manner to its original configuration upon the drawer being returned into the cabinet. An extensible cable having a contracted helical configuration which occupies a small amount of space is ideally suited to solve the above problem; the cable is adapted to be elongated when the drawer is pulled out of the cabinet and to be self-restoring in an orderly, non-entangling manner to its original configuration upon the return of the drawer into the cabinet.

Since the number of electrical components contained in each cabinet drawer will vary from drawer to drawer, it is undesirable to use a stock or standard cable containing a fixed number of conductors with each drawer. A cable having a sufficient number of conductors to interconnect the components of the drawer containing the maximum number of components would result in a waste of conductors and poor economy when used with a drawer containing a lesser number of components. And it is, of course, highly undesirable to stock a large supply of cables containing various numbers of conductors. Accordingly, it becomes highly necessary to provide a method of forming extensible multi-conductor cables of individual conductors equal in number to the components to be interconnected. Such a method prevents waste of conductors and provides an economy of material.

Accordingly, it is an object of the invention to provide a cable to facilitate the interconnections between electrical components contained in pull-out type drawers of a cabinet.

Another object of the invention is to provide an extensible cable for interconnecting electrical components contained in a pull-out type cabinet drawer with other components outside the drawer which cable is adapted to be elongated when the drawer is pulled out from the cabinet and to be self-restoring in an orderly, non-entangling manner to its original configuration upon the drawer being pushed back into the cabinet.

A further object of the invention is to provide a method for making an extensible cable.

Another object of the invention is to provide a method for making an extensible multi-conductor cable having substantially the same resistance to elongation as a single conductor cable of the accumulative diameter of the conductors.

A feature of the invention is an extensible cable comprised of a plurality of conductors bound together tightly by lacing which imparts a contracted helical configuration to the conductors.

Another feature of the invention is an extensible cable comprised of a plurality of individual conductors formed jointly into a contracted helical configuration and being laced together tightly to prevent twisting of the individual conductors and to prevent relative longitudinal movement of the individual conductors whereby a restorative stress is produced in the laced conductors upon the elongation of the cable.

A still further feature of the invention is the provision of a method for forming a multi-conductor extensible cable which includes the steps of forming the conductors into a helix and lacing the conductors together while they are formed in the helix to cause the conductors to retain their helical configuration and to produce a restorative stress upon being elongated.

Another feature of the invention is the provision of a method for forming multi-conductor extensible cable which includes the steps of winding the conductors about a form in helical fashion and lacing the conductors together sufficiently tightly while in the helical configuration to preclude twisting of individual conductors and to preclude relative longitudinal movement of the conductors whereby the laced conductors have substantially the same resistance to elongation as a single conductor of the accumulative diameter of the conductors. A more complete understanding of the invention may be obtained from the following detailed description when read in conjunction with the appended drawings, in which:

Figure 1:
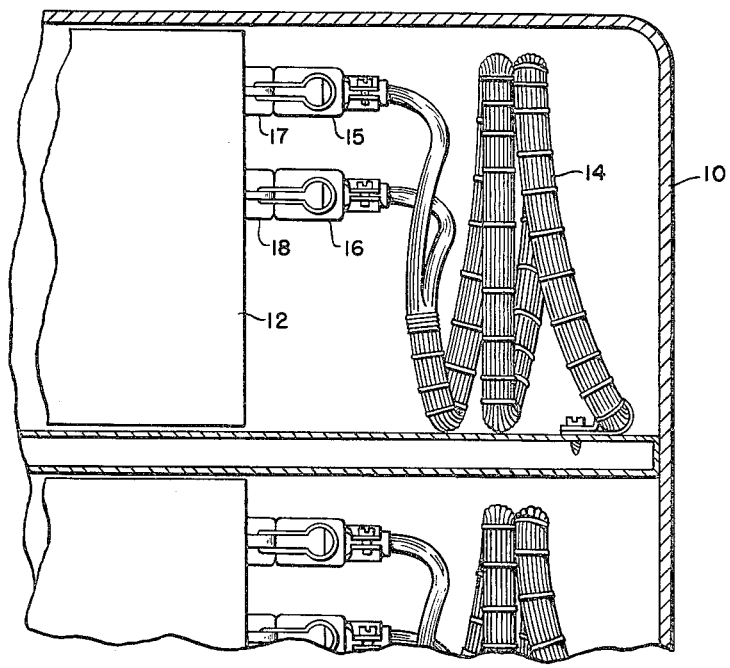
FIG. 1 is a view showing a cabinet in section, a pull-out type drawer positioned slidably in the cabinet and an extensible cable connected to the back of the drawer, the extensible cable being shown in its contracted helical configuration.

Referring now to the drawings, and more particularly to FIG. 1, there is shown, in section, a cabinet 10 having a drawer 12 positioned slidably therein. The drawer 12 contains electrical components (not shown) and is adapted to be pulled out of the cabinet 10 to make the electrical components readily accessible for maintenance and repair. An extensible cable 14 interconnects the electrical components in the drawer 12 with other electrical components in other cabinet drawers or to a main terminal board (not shown) mounted on the cabinet 10. The cable 14 terminates in one or more multi-conductor connectors, such as 15 and 16 which are insertable into sockets 17 and 18, respectively, mounted on the back of the drawer 12.

Figure 2:
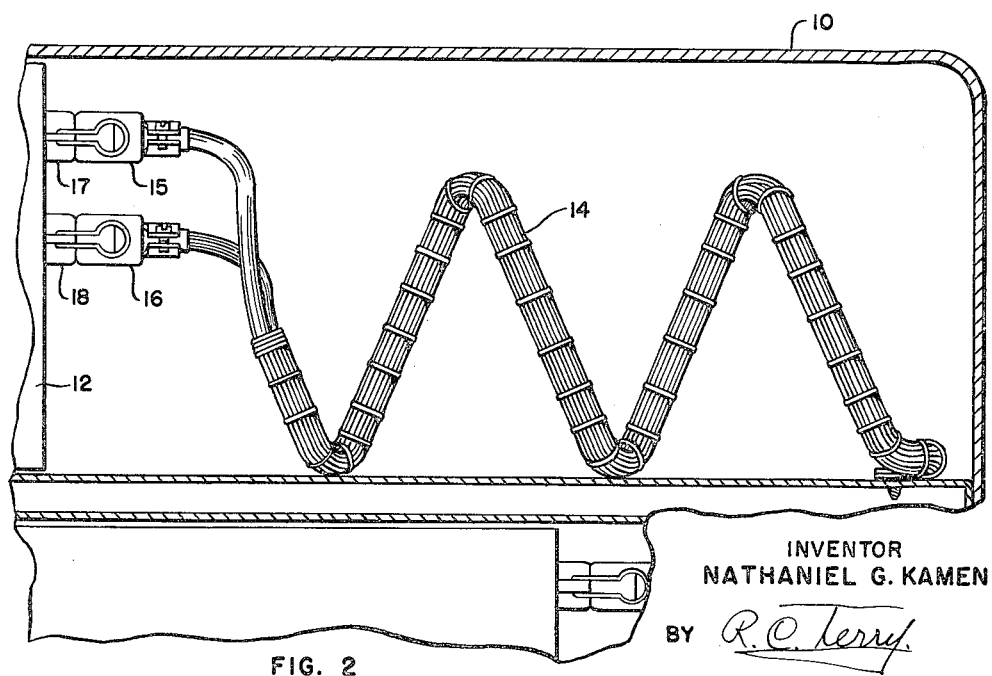
FIG. 2 is a view similar to FIG. 1 but with the drawer shown pulled out from the cabinet and the extensible cable shown in its elongated helical position.

As may be seen in FIG. 1, when the drawer 12 is in its inward position of the cabinet 10, the extensible cable 14 is contracted in the helical configuration shown and hence occupies a very small amount of space, a much smaller amount of space than would be occupied by a non-extensible cable sufficiently long to establish the interconnections when the drawer is in its outward position, shown in FIG. 2, and which probably would assume a disorderly entangling configuration when the drawer is in its inward position. Should the cable become entangled its effective length would become quite shortened and hence could prevent the drawer from being withdrawn from the cabinet or could cause damage to itself and the equipment to which it is connected should the drawer be pulled sharply outward from the cabinet.

Figure 3:
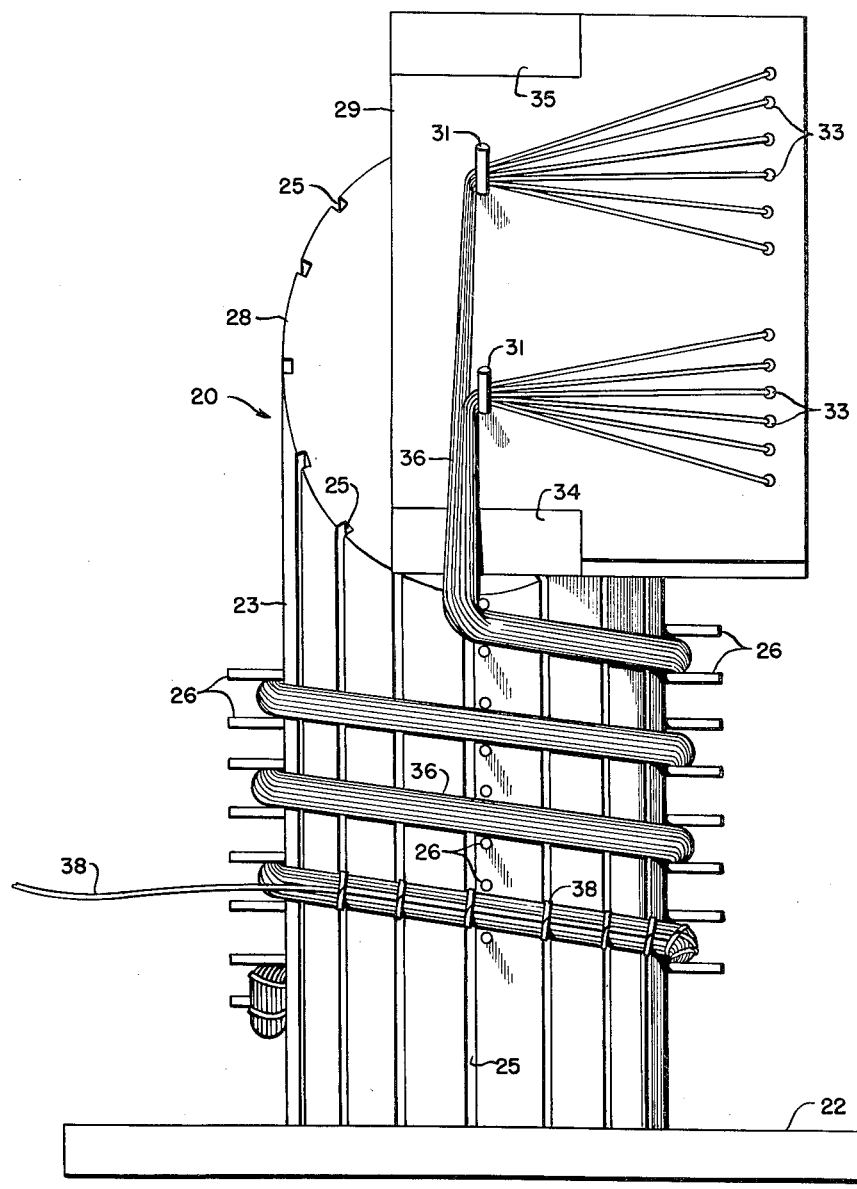
FIG. 3 is an elevational view of a cable assembling form employed in the practice of the method for making a multi-conductor extensible cable.

Referring now to FIG. 3 there is shown a cable forming member 20 which may be utilized to practice the method of forming extensible multi-conductor cables. The cable forming member 20 includes a base 22 on which is mounted vertically a cylindrical form 23 having a plurality of grooves or channels 25 formed therein. Pairs of pegs 26 are spaced circumferentially around the cylindrical form 23 in helical fashion and an inclined surface 28 is formed at the top of the cylindrical form. Secured fixedly to the inclined surface 28 is a fanning board 29 having guiding pegs 31 mounted thereon and terminating holes 33 formed therein. The fanning board is also provided with a pair of bevelled surfaces 34.

To form an extensible multi-conductor cable utilizing the forming member 20, an operator selects a plurality of insulated individual conductors 36, equal in number to the number of external connections to components contained in the drawer to which the extensible cable will be connected, and wraps or winds the conductors around the cylindrical form 23 between the pairs of pegs 26 in a contracted helical fashion. The ends of the conductors are brought out to the fanning board 29 over the bevelled surface 34, which prevents a sharp bend from being placed in the conductors, and are divided and wrapped around the guiding pegs 31 and placed through terminating holes 33. While the conductors 36 are wrapped around the cylindrical form 23 in the contracted helical manner, the operator laces the conductors together tightly with lacing 38 by wrapping the lacing over the top of the conductors and under the conductors by using the grooves 25 in a running lace in the manner well known in the cable lacing art. The ends of the conductors located in terminating holes 33 are attached to connectors 15 and 16 and the laced conductors are removed from the form 23.

The conductors 36 are laced together sufficiently tightly by the lacing 38 so as to prevent twisting of individual conductors and relative longitudinal movement of the conductors with respect to each other. Thus a contracted helical configuration has been imparted to the conductors 36 and the laced conductors will have substantially the same resistance to elongation as a single conductor of the accumulative diameter of the individual conductors.

The cable is then connected to a drawer 12 by inserting connectors 15 and 16 in sockets 17 and 18 as shown in FIG. 1. As the drawer 12 is pulled out from the cabinet 10, the extensible cable 14 is elongated, the laced conductors 36 will resist the toroidal stress applied thereto by the pulling out of the drawer and a restorative stress or tension is developed in the conductors. As the drawer 12 is pushed back into the cabinet 10, the restorative stress or tension causes the cable to contract and return to its original contracted configuration in an orderly, non-entangling manner.

It will be understood that the foregoing is merely illustrative of applicant's invention and that many modifications may be made therein without departing from the spirit and scope of the invention.

What is claimed is:

1. An extensible cable, which comprises a plurality of conductors formed into a contracted helical configuration and being laced together tightly in said contracted helical configuration whereby said laced conductors will tend to return to said contracted helical configuration upon being elongated.

2. An extensible cable, which comprises a pluraltiy of individual conductors formed jointly into a contracted helical configuration and lacing tightly binding said helically arranged conductors together to prevent twisting of said individual conductors and to prevent relative longitudinal movement of the individual conductors whereby said conductors normally remain in said contracted helical configuration, the bound conductors having substantially the same resilience as a single conductor of the accumulative diameter of said conductors and being extensible when placed in tension and self-restoring into a contracted helical configuration when the tension is removed.

3. An extensible cable which comprises a plurality of conductors arranged in generally parallel side-by-side relationship and formed into a contracted helical configuration, and lacings tightly binding said conductors together in said contracted helical configuration whereby said laced conductors tend to return to said contracted helical configuration upon being elongated.

References Cited in the file of this patent

UNITED STATES PATENTS

| | | |
|---|---|---|
| 1,989,066 | Shaw | June 22, 1935 |
| 2,173,096 | Campbell | Sept. 19, 1939 |
| 2,299,140 | Hanson | Oct. 20, 1942 |
| 2,805,471 | Lowden | Sept. 10, 1957 |
| 2,865,979 | Klassen | Dec. 23, 1958 |

FOREIGN PATENTS

| | | |
|---|---|---|
| 762,343 | Great Britain | Nov. 28, 1956 |